US012309799B2

(12) United States Patent
Xiao et al.

(10) Patent No.: US 12,309,799 B2
(45) Date of Patent: May 20, 2025

(54) COMMUNICATION METHODS AND APPARATUSES

(71) Applicant: LENOVO (BEIJING) LIMITED, Beijing (CN)

(72) Inventors: Lingling Xiao, Beijing (CN); Bingchao Liu, Beijing (CN); Chenxi Zhu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 438 days.

(21) Appl. No.: 17/760,604

(22) PCT Filed: Sep. 25, 2019

(86) PCT No.: PCT/CN2019/107920
§ 371 (c)(1),
(2) Date: Mar. 15, 2022

(87) PCT Pub. No.: WO2021/056280
PCT Pub. Date: Apr. 1, 2021

(65) Prior Publication Data
US 2022/0264630 A1 Aug. 18, 2022

(51) Int. Cl.
*H04W 72/23* (2023.01)
*H04L 5/00* (2006.01)

(52) U.S. Cl.
CPC .......... *H04W 72/23* (2023.01); *H04L 5/0048* (2013.01); *H04L 5/0053* (2013.01)

(58) Field of Classification Search
CPC .. H04W 72/23; H04W 72/569; H04L 5/0048; H04L 5/0053; H04L 5/0091
See application file for complete search history.

(56) References Cited

U.S. PATENT DOCUMENTS 11,399,365 B2 * 7/2022 Li ..................... H04W 72/23
2015/0215905 A1 7/2015 Park et al.
(Continued)

FOREIGN PATENT DOCUMENTS

| CN | 104301065 A | 1/2015 |
| CN | 109392140 A | 2/2019 |

(Continued)

OTHER PUBLICATIONS

International Searching Authority, "Written Opinion of the International Searching Authority," PCT/CN2019/107920, Jun. 22, 2020, pp. 1-3.

(Continued)

*Primary Examiner* — Charles C Jiang
*Assistant Examiner* — Rachel Elizabeth Marks
(74) *Attorney, Agent, or Firm* — Kunzler Bean & Adamson

(57) ABSTRACT

Embodiments of the present disclosure relate to a method and apparatus for Multiple-Input Multiple-Output (MIMO) communication. According to an embodiment of the present disclosure, a method can include: transmitting downlink pre-emption configuration information to a user equipment (UE), wherein the downlink pre-emption configuration information comprises a first indication indicating a start position of a first pre-emption indication within first downlink control information (DCI); transmitting the first DCI comprising the first pre-emption indication to the UE. Embodiments of the present disclosure provide methods for pre-emption indication in multi-TRP transmission.

18 Claims, 8 Drawing Sheets

(56) References Cited

U.S. PATENT DOCUMENTS

| | | | | |
|---|---|---|---|---|
| 2018/0324816 A1* | 11/2018 | Islam | .................... | H04L 5/0053 |
| 2019/0098612 A1 | 3/2019 | Babaei et al. | | |
| 2019/0165984 A1* | 5/2019 | Shapin | ................. | H04W 72/53 |
| 2020/0205059 A1* | 6/2020 | Khoshnevisan | ...... | H04L 5/0053 |
| 2023/0309105 A1* | 9/2023 | Yi | .................... | H04W 72/0446 |

FOREIGN PATENT DOCUMENTS

| | | |
|---|---|---|
| CN | 109863809 A | 6/2019 |
| CN | 110149172 A | 8/2019 |
| WO | 2019050451 A1 | 3/2019 |

OTHER PUBLICATIONS

Intel Corp., "Indication of preemption of DL transmissions", 3GPP TSG RAN WG1 Meeting #89 R1-1707414, May 15-19, 2017, pp. 1-6.

* cited by examiner

COMMUNICATION METHODS AND APPARATUSES

TECHNICAL FIELD

Embodiments of the present application generally relate to wireless communication technology, and in particular to a method and an apparatus for Multiple-Input Multiple-Output (MIMO) communication.

BACKGROUND

Multiple transmit-receive points (multi-TRPs) transmission has been introduced into New Radio (NR). During multi-TRPs transmission, a TRP (or panel) can be used to transmit data to a first user equipment (UE) having relatively great tolerance of transmission delay or latency, and to transmit data to a second UE having relatively less tolerance of transmission delay or latency. If data to the second UE arrives at the transmission instant of the first UE and if there is no sufficient resources for non-overlapping data transmission for both the first UE and the second UE, the data transmission to the second UE will occupy the resources scheduled to the first UE since the second UE may have relatively less tolerance of transmission delay or latency.

SUMMARY OF THE APPLICATION

Some embodiments of the present application provide a technical solution for pre-emption indication in multi-TRP transmission.

According to an embodiment of the present application, a method may include: transmitting downlink pre-emption configuration information to a UE, wherein the downlink pre-emption configuration information may include a first indication indicating a start position of a first pre-emption indication within first downlink control information (DCI); and transmitting the first DCI including the first pre-emption indication to the UE.

According to another embodiment of the present application, a method may include: receiving, at a UE, first downlink pre-emption configuration information, wherein the first downlink pre-emption configuration information may include a first indication indicating a start position of first pre-emption indication within a first DCI; and receiving, at the UE, the first DCI including the first pre-emption indication.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for a technical solution for pre-emption indication in multi-TRP transmission. Accordingly, embodiments of the present application can increase the robustness of multi-TRP transmission in a communication network, and facilitate the deployment and implementation of the NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

A wireless communication system, can have one TRP (or panel) or some TRPs (or panels). A TRP can function as a base station. The TRPs can communicate with each other by backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

One single TRP can be used to serve one or more UEs under control of a base station. A TRP can represent various communication devices. A base station can also have one or some TRPs. For example, in some application scenarios, in a Coordinated Multi-Point (CoMP) scenario, the TRP can represent a base station. Persons skilled in the art should understand that as the 3GPP and the communication technology develop, the terminologies recited in the specification may change, which should not affect the scope of the present application.

Figure 1:
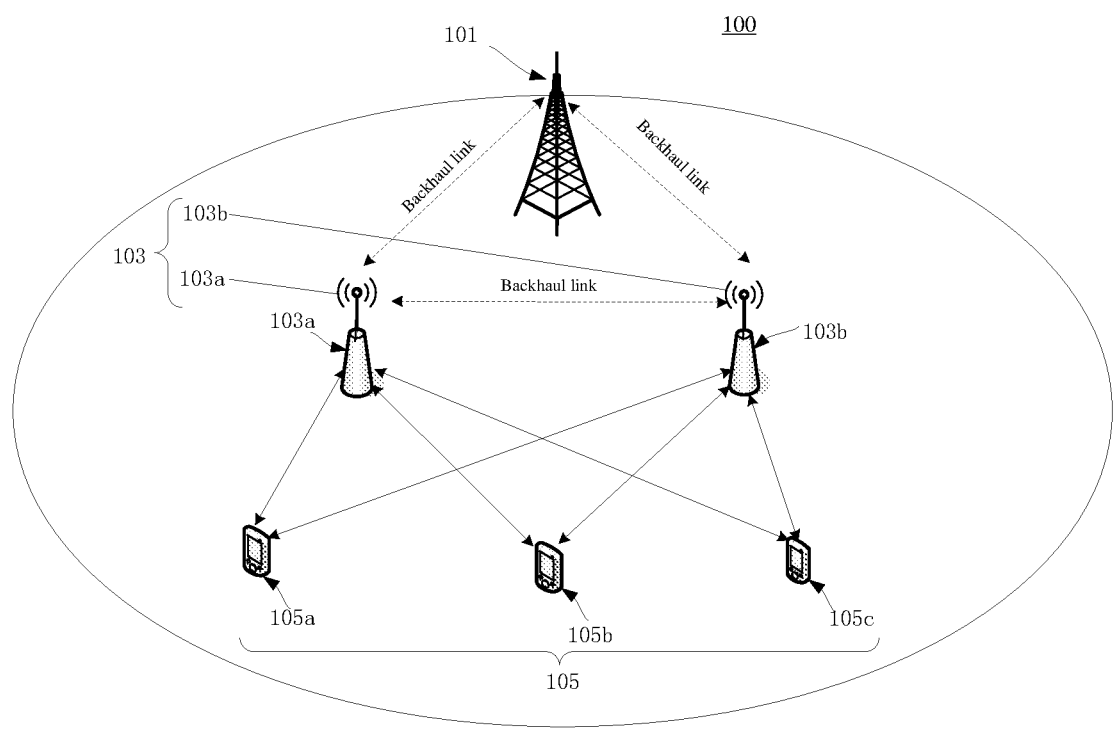
FIG. 1 is a schematic diagram illustrating an exemplary wireless communication system according to some embodiments of the present application.

FIG. 1 is a schematic diagram illustrating an exemplary wireless communication system according to some embodiments of the present application.

Referring to FIG. 1, a wireless communication system 100 can include a base station 101, TRPs 103 (e.g., TRP 103a and TRP 103b), and UEs 105 (e.g., UE 105a, UE 105b, and UE 105c). Although only one base station 101, two TRPs 103 and three UEs 105 are shown for simplicity, it should be noted that the wireless communication system 100 may include more or less communication device(s) or apparatus in accordance with some other embodiments of the present application.

The base station 101 can be referred to as a gNB in some application scenarios (e.g. in 5G application scenario).

The TRPs 103, for example, the TRP 103a and the TRP 103b can communicate with the base station 101 via, for example, a backhaul link. Each of TRP 103 can serve some or all of UEs 105. As shown in FIG. 1, the TRP 103a can serve some mobile stations (which includes the UE 105a, the UE 105b, and the UE 105c) within a serving area or region (e.g., a cell or a cell sector). The TRP 103b can serve some mobile stations (which includes the UE 105a, the UE 105b, and the UE 105c) within a serving area or region (e.g., a cell or a cell sector). The TRP 103a and the TRP 103b can communicate to each other via, for example, a backhaul link. The UE 105a can include a computing device, a wearable device, or a mobile device, etc. The UE 105b can include device same or similar to the UE 105a. The UE 105b can include device different from the UE 105a. The UE 105c can include device same or similar to the UE 105a. The UE 105c can include device different from the UE 105a.

In accordance with NR Rel-15, a base station may transmit data for a UE having relatively great tolerance of transmission delay or latency, for example an enhanced mobile broadband (eMBB) UE. The base station may also need to transmit data to another UE which may have relatively less tolerance of transmission delay or latency (e.g. an ultra-reliable low latency communications (URLLC) UE).

If there is no sufficient resources for non-overlapping data transmission for both the eMBB UE and the URLLC UE at a base station or a TRP, since the URLLC UE may have relatively less tolerance of transmission delay or latency, the base station or the TRP can pre-empt resource(s), which is scheduled (or prescheduled) for the eMBB UE, to transmit data for the URLLC UE.

To avoid error(s) that may occur or happen, for example, to avoid error(s) in data demodulation in the eMBB UE, the TRP or base station can transmit a pre-emption indication in downlink control information (DCI) (e.g., DCI format 2_1) to indicate the resource(s) (e.g. the time-frequency resource(s)) to be pre-empted to the eMBB UE.

The solution discussed above may work in a single TRP transmission. However, in multi-TRP transmission, data for the eMBB UE can be transmitted by different layers or different PDSCHs from different TRPs, but not all of these TRPs will transmit data to an URLLC UE. Accordingly, the eMBB UE may not be aware of which layer(s) or PDSCH(s) are going to be pre-empted for data transmission for the URLLC UE.

In other words, the eMBB UE needs to know which layer(s) (or PDSCH(s)) transmitted from one TRP to be pre-empted by the URLLC UE. Therefore, pre-emption indication is required to indicate resource(s) on layer(s) (or PDSCH(s)) from one TRP are pre-empted for data transmission for the URLLC UE.

Embodiments of the present application can provide technical solutions at least solving the above technical problems.

More details on the embodiments of the present application will be illustrated in the following text in combination with the appended drawings.

Figure 2:
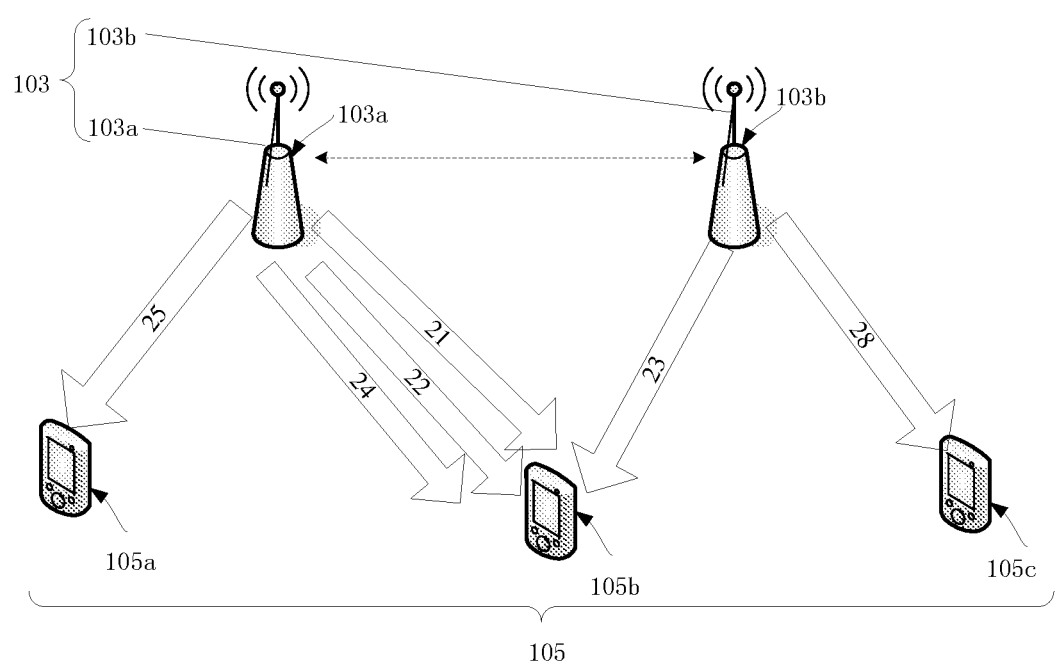
FIG. 2 illustrates a scenario of pre-emption indication in multi-TRP transmission according to some embodiments of the present application.

FIG. 2 illustrates a scenario of pre-emption indication in multi-TRP transmission according to some embodiments of the present application.

Referring to FIG. 2, the wireless communication system may include two TRPs 103 (e.g., a TRP 103a and a TRP 103b), and three UEs 105 (e.g., a UE 105a, a UE 105b, and a UE 105c). The UE 105b may be a UE having relatively great tolerance of transmission delay or latency, for example an eMBB UE. Each of the UE 105a and the UE 105c may be a UE have relatively less tolerance of transmission delay or latency, for example an URLLC UE.

Both of the TRP 103a and 103b can serve the UE 105b. The TRP 103a may also serve the UE 105a. The TRP 103b may also serve the UE 105c.

As shown in FIG. 2, the TRP 103a may transmit DCI 21 for scheduling a physical downlink shared channel (PDSCH) transmission for the UE 105b. The PDSCH transmission may include a first data transmission 22 on a first set of layers transmitted from the first set of demodulation reference signal (DMRS) ports of the TRP 103a and a second transmission 23 on a second set of layers transmitted from the second set of DMRS ports of the TRP 103b. Data on each layer may be transmitted from a respective DMRS port. The first set of layers may include one or more layers and the second set of layers may include one or more layers which are different from the layers included in the first set of layers. The first set of DMRS ports may include one or more DMRS ports and the second set of DMRS ports may include one or more DMRS ports which are different from the DMRS ports included in the first set of DMRS ports.

The DCI 21 may also include a TCI codepoint indicating two TCI states, i.e., a first transmission configuration indicator (TCI) state and a second TCI state. The first TCI state is associated with a first set of code division multiplexing (CDM) groups including the first set of DMRS ports of the TRP 103a and the second TCI state is associated with a second set of CDM groups including the second set of DMRS ports of the TRP 103b. The first set of CDM groups may include one or two CDM groups and the second set of CDM groups may include one or two CDM groups different from the CDM group(s) included in the first set of CDM groups.

During the instant of data transmission 22 and data transmission 23 to the UE 105b, an URLLC transmission 25 to the UE 105a and/or an URLLC transmission 28 to the UE 105c may arrive at the TRP 103a and/or the TRP 103b. Assuming that there is no enough resource for non-overlapping transmission to the UE 105b and the URLLC transmission to the UE 105a and/or the UE 105c, the URLLC transmission will pre-empt a portion of resources of the first set of layers from the TRP 103a and/or a portion of resources of the second set of layers from the TRP 103b.

To indicate the pre-empted resources of the TRP 103a and/or the TRP 103b to the UE 105b, the TRP 103a or the TRP 103b may transmit downlink pre-emption configuration information to the UE 105b. The downlink pre-emption configuration information may be included in a plurality of high layer parameters configured by a high layer by a base station 101. For example, the high layer may represent a layer higher than the PHY (physical) layer, such as a RRC (Radio Resource Control) layer. The downlink pre-emption configuration information may be a "DownlinkPreemption" information element (IE) as defined in TS38.331. The downlink pre-emption configuration information may include one or more indications (e.g., positionInDCI field(s)) of one serving cell indicating one or more start positions of one or more pre-emption indications within DCI 24 (e.g., DCI format 2_1). The downlink pre-emption configuration information may also include the followings: an int-RNTI field as defined in TS 38.331 for indicating the interruption-radio network temporary identity (INT-RNTI) for monitoring physical downlink control channel (PDCCH) conveying the DCI 24, a set of int-ConfigurationPerServingCell fields with each int-ConfigurationPerServingCell field indicating a serving cell index as defined in TS 38.331, one or more positionInDCI as stated above, and dci-PayloadSize field as defined in TS 38.331 for indicating a payload size for DCI 24.

In addition, to indicate the pre-empted resources of the TRP 103a and/or the TRP 103b to the UE 105b, the TRP 103b or the TRP 103b may also need to transmit a DCI 24 (e.g., DCI format 2_1) to the UE 105b. The DCI 24 may be transmitted in a common search space. In FIG. 2, assuming that only the TRP 103a is configured with at least one common search space, then the TRP 103a may transmit DCI 24 to the UE 105b. The size of the DCI 24 may be configured by the high layer and up to 126 bits. The DCI 24 may include one or more pre-emption indications of one serving cell. Each of the one or more pre-emption indications may indicate a portion of resources (e.g., time-frequency resource(s)) of one set of layers on which no transmission is intended to the UE. In an embodiment of the present application, the time-frequency resource(s) may be physical resource block (PRB) and orthogonal frequency division multiplexing (OFDM) symbols.

According to some embodiments of the present application, the downlink pre-emption configuration information may include a first indication (e.g., positionInDCI1 field) indicating a start position of a first pre-emption indication within the DCI 24 and a second indication (e.g., positionInDCI2 field) indicating a start position of a second pre-emption indication within the DCI 24. The first pre-emption indication may be 14-bit information indicating a portion of resources (e.g., PRB(s) and OFDM symbol(s)) of the first set of layers of the TRP 103a on which no transmission is intended to the UE. The second pre-emption indication may be 14-bit information indicating a portion of resources (e.g., PRB(s) and OFDM symbol(s)) of the second set of layers of the TRP 103b on which no transmission is intended to the UE. The portion of resources of layers may refer to partial or all resources of the layers.

After receiving the downlink pre-emption configuration information, the UE 105b may first obtain that the first pre-emption indication within the DCI 24 based on positionInDCI1 field and obtain the second pre-emption indication within the DCI 24 based on positionInDCI2 field. In some embodiments of the present disclosure, the first pre-emption indication may be a continuous bitstream with 14 bits. The UE 105b may determine the start position of the first pre-emption indication within the DCI 24 based on positionInDCI1 field and then determine the continuous 14 bits from the start position indicated by positionInDCI1 field to be the first pre-emption indication. In some other embodiments of the present disclosure, the second pre-emption indication may be a continuous bitstream with 14 bits. The UE 105b may determine the start position of the second pre-emption indication within the DCI 24 based on positionInDCI2 field, and then determine the continuous 14 bits from the start position indicated by positionInDCI2 field to be the second pre-emption indication.

Then, the UE 105b may associate the first pre-emption indication with the first TCI state and associate the second pre-emption indication with the second TCI state. Since the first TCI state may be associated with a first set of CDM groups including the first set of DMRS ports and the first set of DMRS ports may be associated with the first set of layers of the TRP 103a, the UE 105b may determine that the first pre-emption indication is used for indicating a portion of resources of the first set of layers of the TRP 103a on which no transmission is intended to the UE. Similarly, since the second TCI state may be associated with a second set of CDM groups including the second set of DMRS ports and the second set of DMRS ports may be associated with the second set of layers of the TRP 103b, the UE 105b may determine that the second pre-emption indication is used for indicating a portion of resources of the second set of layers of the TRP 103b on which no transmission is intended to the UE. Thus, the UE may not decode the data transmission on the first set of layers on the resources indicated by the first pre-emption indication and not decode the data transmission on the second set of layers on the resources indicated by the second pre-emption indication.

In the case that no resource on the first set of layers from the TRP 103a is pre-empted by the URLLC transmission, each bit of the first pre-emption indication may be set to 0 to indicate that no resource on the first set of layers from the TRP 103a is pre-empted by the URLLC transmission. Similarly, in the case that no resource on the second set of layers from the TRP 103b is pre-empted by the URLLC transmission, each bit of the second pre-emption indication may be set to 0 to indicate that no resource on the second set of layers from the TRP 103b is pre-empted by the URLLC transmission.

For example, assuming that the first set of layers of the TRP 103a includes layer 0 and layer 1 and the second set of layers of the TRP 103b includes layer 2 and layer 3, the first set of DMRS ports of the TRP 103a include DMRS port 0 and DMRS port 1 and the second set of DMRS ports of the TRP 103b include DMRS port 2 and DMRS port 3, data on layer 0 is transmitted from DMRS port 0, data on layer 1 is transmitted from DMRS port 1, data on layer 2 is transmitted from DMRS port 2, data on layer 3 is transmitted from DMRS port 3. Moreover, assuming that the TCI codepoint may indicate TCI state 1 and TCI state 2, TCI state 1 is associated with a CDM group 0 including DMRS port 0 and DMRS port 1 and TCI state 2 is associated with a CDM group 1 including DMRS port 2 and DMRS port 3.

In the example, the downlink pre-emption configuration information may include positionInDCI1 field indicating a start position of a first pre-emption indication within DCI 24 and a positionInDCI2 field indicating a start position of a second pre-emption indication within the DCI 24. The first pre-emption indication may indicate a portion of resources of layers 0 and 1 on which no transmission is intended to the UE. The second pre-emption indication may indicate a portion of resources of layers 2 and 3 on which no transmission is intended to the UE. In the case that no resource on the layers 0 and 1 from the TRP 103a is pre-empted by the URLLC transmission, each bit of the first pre-emption indication may be set to 0 to indicate that no resource on the first set of layers from the TRP 103a is pre-empted by the URLLC transmission. In the case that no resource on the layers 2 and 3 from the TRP 103b is pre-empted by the URLLC transmission, each bit of the first pre-emption indication may be set to 0 to indicate that no resource on the layer 2 and 3 from the TRP 103b is pre-empted by the URLLC transmission.

After receiving the downlink pre-emption configuration information, the UE 105b may first obtain the first pre-emption indication within the DCI 24 based on positionInDCI1 field and obtain the second pre-emption indication within the DCI 24 based on positionInDCI2 field. Then, the UE 105b may associate the first pre-emption indication with the TCI state 1 and associate the first pre-emption indication with the TCI state 2. Since the first TCI state is associated with CDM group 0 including DMRS ports 0 and 1 the DMRS ports 0 and 1 may be associated layer 0 and layer 1, the UE 105b may determine that the first pre-emption indication is used for indicating a portion of resources of layer 0 and layer 1 of the TRP 103a on which no transmission is intended to the UE. Similarly, since the TCI state 2 may be associated with CDM group 1 including DMRS ports 2 and 3 and the DMRS ports 2 and 3 may be associated with layers 2 and 3, the UE 105b may determine that the second pre-emption indication is used for indicating a portion of resources of the layer 2 and 3 of the TRP 103b on which no transmission is intended to the UE.

According to some embodiments of the present application, the URLLC transmission may merely pre-empt resources of one of the TRP 103a and the TRP 103b. In the case, only one pre-emption indication may be enough for indicating the pre-empted resources of one TRP.

In these embodiments, the TRP 103a or the TRP 103b may transmit downlink pre-emption configuration information to the UE 105b. The downlink pre-emption configuration information may be the "DownlinkPreemption" information element (IE) as defined in TS38.331. The downlink pre-emption configuration information may include an indication indicating a start position of a pre-emption indication within a DCI 24, for example DCI format 2_1. The indication may be a positionInDCI1 field or positionInDCI2 field in the "DownlinkPreemption" information element (IE).

In the cast that positionInDCI1 field is included in the downlink pre-emption configuration information while positionInDCI2 field is empty, the pre-emption indication indicated by the positionInDCI1 field may indicate a portion of resources (PRB(s) and OFDM symbol(s)) of the first set of layers of the TRP 103a on which no transmission is intended to the UE.

In the cast that positionInDCI2 field is included in the downlink pre-emption configuration information while positionInDCI1 field is empty, the pre-emption indication indicated by the positionInDCI2 field may indicate a portion of resources (PRB(s) and OFDM symbol(s)) of the second set of layers of the TRP 103b on which no transmission is intended to the UE.

After receiving the downlink pre-emption configuration information, the UE 105b may first obtain that the pre-emption indication within the DCI 24 based on positionInDCI1 field or positionInDCI2 field. In some embodiments of the present disclosure, the pre-emption indication may be a continuous bitstream with 14 bits. The UE 105b may determine the start position of the pre-emption indication within the DCI 24 based on positionInDCI1 field or positionInDCI2 field and then determine the continuous 14 bits from the start position indicated by positionInDCI1 field or positionInDCI2 field to be the pre-emption indication.

In the case that the pre-emption indication is obtained based on positionInDCI1 field, the UE may associate the pre-emption indication with the first TCI state. Since the first TCI state may be associated with a first set of CDM groups including the first set of DMRS ports and the first set of DMRS ports may be associated with the first set of layers of the TRP 103a, the UE 105b may determine that the pre-emption indication is used for indicating a portion of resources of the first set of layers of the TRP 103a on which no transmission is intended to the UE.

Similarly, in the case that the pre-emption indication is obtained based on positionInDCI2 field, the UE may associate the pre-emption indication with the second TCI state. Since the second TCI state may be associated with a second set of CDM groups including the second set of DMRS ports and the second set of DMRS ports may be associated with the second set of layers of the TRP 103b, the UE 105b may determine that the pre-emption indication is used for indicating a portion of resources of the second set of layers of the TRP 103b on which no transmission is intended to the UE.

For example, assuming that the first set of layers of the TRP 103a includes layer 0 and layer 1 and the second set of layers of the TRP 103b includes layer 2 and layer 3, the first set of DMRS ports of the TRP 103a include DMRS port 0 and DMRS port 1 and the second set of DMRS ports of the TRP 103b include DMRS port 2 and DMRS port 3, data on layer 0 is transmitted from DMRS port 0, data on layer 1 is transmitted from DMRS port 1, data on layer 2 is transmitted from DMRS port 2, data on layer 3 is transmitted from DMRS port 3. Moreover, assuming that the TCI codepoint may indicate TCI state 1 and TCI state 2 and TCI state 1 is associated with a CDM group 0 including DMRS port 0 and DMRS port 1 and TCI state 2 is associated with a CDM group 1 including DMRS port 2 and DMRS port 3.

In the example, in the case that only resources on layers 0 and 1 are pre-empted by the URLLC transmission 25, the downlink pre-emption configuration information may merely include positionInDCI1 field. In the case that only resources on layers 2 and 3 are pre-empted by the URLLC transmission 28, the downlink pre-emption configuration information may merely include positionInDCI2 field.

After receiving the downlink pre-emption configuration information, the UE 105b may first obtain the pre-emption indication within the DCI 24 based on positionInDCI1 field or positionInDCI2 field. In the case that the pre-emption indication is obtained based on the positionInDCI1 field, the UE 105b may associate the pre-emption indication with the TCI state 1. Since the first TCI state is associated with CDM group 0 including DMRS ports 0 and 1, the DMRS ports 0 and 1 may be associated layer 0 and layer 1, the UE 105b may determine that the pre-emption indication is used for indicating a portion of resources of the layer 0 and 1 of the TRP 103a on which no transmission is intended to the UE.

Similarly, in the case that the pre-emption indication is obtained based on the positionInDCI2 field, the UE 105b may associate the pre-emption indication with the TCI state 2. Since the TCI state 2 may be associated with CDM group 1 including DMRS ports 2 and 3 and the DMRS ports 2 and 3 may be associated with layers 2 and 3, the UE 105b may determine that the pre-emption indication is used for indicating a portion of resources of the layer 2 and 3 of the TRP 103b on which no transmission is intended to the UE.

According to some embodiments of the present application, regardless of whether one or two indications of one serving cell for indicating position(s) of pre-emption indication(s) within the DCI 24 are included in the downlink pre-emption configuration information, the TRP 103a or the TRP 103b may transmit configuration information associating the indication(s) with TCI states(s).

In an embodiment of the present application, the downlink pre-emption configuration information may include a first indication (e.g., positionInDCI1 field) indicating a start position of a first pre-emption indication within the DCI 24 and a second indication (e.g., positionInDCI2 field) indicating a start position of a second pre-emption indication within the DCI 24. In this embodiment, the TRP 103*a* or the TRP 103*b* may transmit configuration information associating the first indication with one TCI state of the first TCI state and the second TCI state and associating the second indication with the other TCI state of the first TCI state and the second TCI state.

After receiving the downlink pre-emption configuration information, the UE 105*b* may first obtain the first pre-emption indication within the DCI 24 based on positionInDCI1 field. The UE may also obtain the second pre-emption indication within the DCI 24 based on positionInDCI2 field. In some embodiments of the present disclosure, the first pre-emption indication may be a continuous bitstream with 14 bits. The UE 105*b* may determine the start position of the first pre-emption indication within the DCI 24 based on positionInDCI1 field and then determine the continuous 14 bits from the start position indicated by positionInDCI1 field to be the first pre-emption indication. In some other embodiments of the present disclosure, the second pre-emption indication may be a continuous bitstream with 14 bits. The UE 105*b* may determine the start position of the second pre-emption indication within the DCI 24 based on positionInDCI2 field, and then determine the continuous 14 bits from the start position indicated by positionInDCI2 field to be the second pre-emption indication.

Based on the configuration information, the UE 105*b* may determine that the first pre-emption indication indicated by the positionInDCI1 field is associated with one of the first TCI state and the second TCI state and the second pre-emption indication indicated by the positionInDCI2 field is associated with the other of the first TCI state and the second TCI state. Since the first TCI state may be associated with the first set of CDM groups including the first set of DMRS ports and the first set of DMRS ports may be associated with the first set of layers, which implies that the first TCI state may be associated with the first set of layers. Similarly, since the second TCI state may be associated with the second set of CDM groups including the second set of DMRS ports and the second set of DMRS ports may be associated with the second set of layers, which implies that the second TCI state may be associated with the second set of layers.

Given the above, the UE 105*b* may determine that the first pre-emption indication may indicate a portion of resources of one of the first set of layers and the second set of layers associated with the one TCI state which is associated with the first indication on which no transmission is intended to the UE. The UE 105*b* may also determine that the second pre-emption indication may indicate a portion of resources of the other one of the first set of layers and the second set of layers on which no transmission is intended to the UE.

In another embodiment of the present application, the downlink pre-emption configuration information may only include one indication, for example positionInDCI field indicating a start position of a pre-emption indication within a DCI 24. In this embodiment, the TRP 103*a* or the TRP 103*b* may transmit configuration information associating the indication with one of the first TCI state and the second TCI state.

After receiving the downlink pre-emption configuration information, the UE 105*b* may first obtain the pre-emption indication within the DCI 24 based on positionInDCI field. Based on the configuration information, the UE 105*b* may determine that the pre-emption indication indicated by the positionInDCI field is associated with one of the first TCI state and the second TCI state. In some embodiments of the present disclosure, the pre-emption indication may be a continuous bitstream with 14 bits. The UE 105*b* may determine the start position of the pre-emption indication within the DCI 24 based on positionInDCI field and then determine the continuous 14 bits from the start position indicated by positionInDCI field to be the pre-emption indication.

As stated above, the first TCI state may be associated with the first set of layers and the second TCI state may be associated with the second set of layers. Given this, the UE 105*b* may determine that the pre-emption indication may indicate a portion of resources of the one of the first set of layers and the second set of layers associated with the one TCI state which is associated with the indication on which no transmission is intended to the UE.

According to some embodiments of the present application, the URLLC transmission may merely pre-empt resources of one of the TRP 103*a* and the TRP 103*b*. In the case, only one pre-emption indication may be enough for indicating the pre-empted resources of one TRP.

In these embodiments, the TRP 103*a* or the TRP 103*b* may transmit downlink pre-emption configuration information to the UE 105*b*. The downlink pre-emption configuration information may be the "DownlinkPreemption" information element (IE) as defined in TS38.331. The downlink pre-emption configuration information may include an indication indicating a start position of a pre-emption indication within a DCI 24, for example DCI format 2_1.

In this embodiment, the pre-emption indication may include an indicator which indicates that the pre-emption indication is associated with one TCI state of the first TCI state or the second TCI state. According to some embodiments of the present application, the pre-emption indication may be a continuous bitstream with 14 bits plus the size (e.g., one or more bits) of the indicator. In one embodiment of the present application, the indicator may be 1-bit information with a value "0" or "1". For example, "0" may indicate that the pre-emption indication is associated with the first TCI state. "1" may indicate that the pre-emption indication is associated with the second TCI state. In another embodiment, "1" may indicate that the pre-emption indication is associated with the first TCI state. "0" may indicate that the pre-emption indication is associated with the second TCI state. In this embodiment, the pre-emption indication may have 15 bits, wherein 14 bits are used for indicating the resource(s) of a set of layer on which no transmission is intended to the UE and 1 bit is used to indicate the pre-emption indication is associated with one TCI state of the first TCI state or the second TCI state.

After receiving the downlink pre-emption configuration information, the UE 105*b* may first obtain the pre-emption indication within the DCI 24 based on positionInDCI field. In some embodiments of the present disclosure, the pre-emption indication may be a continuous bitstream with 14 bits plus the size (e.g., one or more bits) of the indicator. The UE 105*b* may determine the start position of the pre-emption indication within the DCI 24 based on positionInDCI1 field and then determine the continuous 14 bits plus the size (e.g., one or more bits) of the indicator from the start position indicated by positionInDCI1 field to be the pre-emption indication.

Based on the indicator included in the pre-emption indication, the UE 105*b* may determine that the pre-emption indication is associated with one of the first TCI state and the second TCI state indicated by the indicator.

As stated above, the first TCI state may be associated with the first set of layers and the second TCI state may be associated with the second set of layers. Given this, the UE 105*b* may determine that the pre-emption indication may indicate a portion of resources of the one of the first set of layers and the second set of layers associated with the one TCI state which is indicated by the indicator on which no transmission is intended to the UE.

Figure 3:
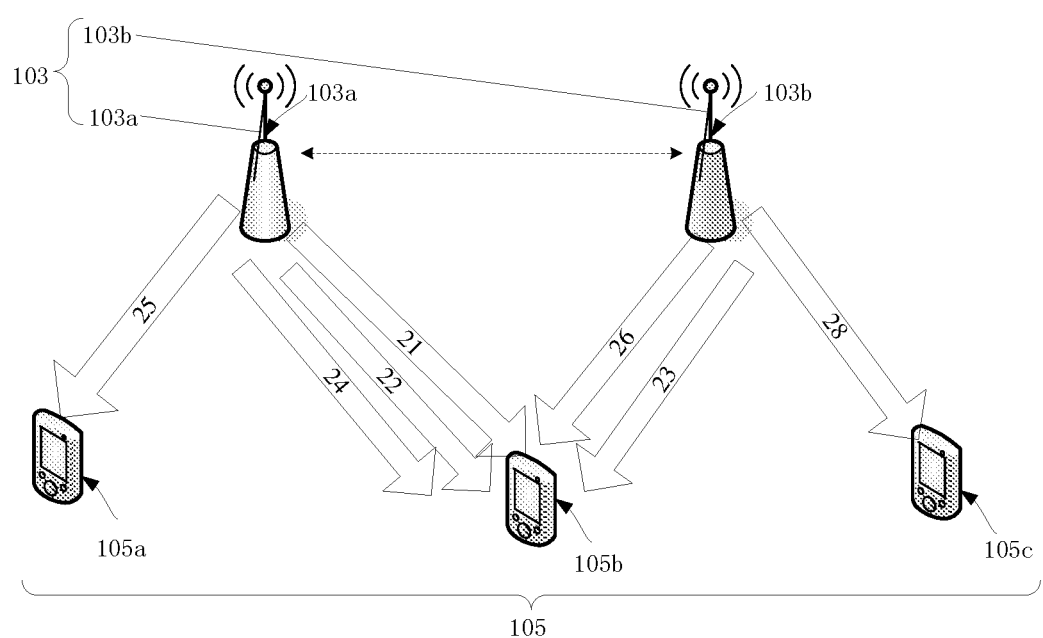
FIG. 3 illustrates a scenario of pre-emption indication in multi-TRP transmission according to some other embodiments of the present application.

FIG. 3 illustrates a scenario of pre-emption indication in multi-TRP transmission according to some other embodiments of the present application.

Referring to FIG. 3, the wireless communication system may include two TRPs 103 (e.g., a TRP 103*a* and a TRP 103*b*), and three UEs 105 (e.g., a UE 105*a*, a UE 105*b*, and a UE 105*c*). The UE 105*b* may be a UE having relatively great tolerance of transmission delay or latency, for example an eMBB UE. Each of the UE 105*a* and the UE 105*c* may be a UE have relatively less tolerance of transmission delay or latency, for example an URLLC UE.

Both of the TRP 103*a* and 103*b* can serve the UE 105*b*. The TRP 103*a* may also serve the UE 105*a*. The TRP 103*b* may also serve the UE 105*c*.

As shown in FIG. 3, the TRP 103*a* may transmit DCI 21 for scheduling a first transmission 22 on a first PDSCH (i.e., a first PDSCH transmission) from the TRP 103*a* to the UE 105*b*. The TRP 103*b* may transmit DCI 26 for scheduling a second transmission 23 on a second PDSCH (i.e., a second PDSCH transmission) from the TRP 103*b* to the UE 105*b*.

The TRP 103*a* or the TRP 103*b* may also transmit configuration information indicating a first control-resource set (CORESET) group for the TRP 103*a* and a second CORESET group for the TRP 103*b*.

According to some embodiments of the present application, the configuration information may directly include the first CORESET group for the TRP 103*a* and the second CORESET group for the TRP 103*b*. The first CORESET group may include one or more CORESETs. The second CORESET group may include one or more CORESETs which are different from the CORESETs included in the first CORESET group.

According to some other embodiments of the present application, the configuration information may include one or more high layer indexes, each of the one or more high layer indexes may be associated with one CORESET. After receiving the configuration information, the UE may determine that the CORESETs with the same high layer index are in a CORESET group.

During the instant of PDSCH transmission 22 and PDSCH transmission 23 to the UE 105*b*, an URLLC transmission 25 to the UE 105*a* and/or an URLLC transmission 28 to the UE 105*c* may arrive at the TRP 103*a* and/or the TRP 103*b*. Assuming that there is no enough resource for non-overlapping transmission to the UE 105*b* and URLLC transmission to the UE 105*a* and/or the UE 105*c*, the URLLC transmission will pre-empt a portion of resources of the first PDSCH from the TRP 103*a* and/or a portion of resources of the second PDSCH from the TRP 103*b*.

To indicate the pre-empted resources of the TRP 103*a* and/or the TRP 103*b* to the UE 105*b*, the TRP 103*a* or the TRP 103*b* may transmit downlink pre-emption configuration information to the UE 105*b*. The downlink pre-emption configuration information may be included in a plurality of high layer parameters configured by a high layer by a base station 101. For example, the high layer may represent a layer higher than the PHY (physical) layer, such as a RRC (Radio Resource Control) layer. The downlink pre-emption configuration information may be a "DownlinkPreemption" information element (IE) as defined in TS38.331. The downlink pre-emption configuration information may include one or more indications (e.g., positionInDCI field(s)) of one serving cell indicating one or more start positions of one or more pre-emption indications within DCI 24 (e.g., DCI format 2_1). The downlink pre-emption configuration information may also include the followings: an int-RNTI field as defined in TS 38. 331 for indicating the interruption-radio network temporary identity (INT-RNTI) for monitoring physical downlink control channel (PDCCH) conveying the DCI 24, a set of int-ConfigurationPerServingCell fields with each int-ConfigurationPerServingCell field indicating a serving cell index as defined in TS 38. 331, and dci-PayloadSize field as defined in TS 38. 331 for indicating a payload size for DCI 24.

In addition, to indicate the pre-empted resources of the TRP 103*a* and/or the TRP 103*b* to the UE 105*b*, the TRP 103*b* or the TRP 103*b* may also need to transmit a DCI 24 (e.g., DCI format 2_1) to the UE 105*b*. The DCI 24 may be transmitted in a common search space. In FIG. 3, assuming that only the TRP 103*a* is configured with at least one common search space, then the TRP 103*a* may transmit DCI 24 to the UE 105*b*. The size of the DCI 24 may be configured by the high layer and up to 126 bits. The DCI 24 may include one or more pre-emption indications. Each of the one or more pre-emption indications may indicate a portion of resources (e.g., time-frequency resource(s)) of one PDSCH on which no transmission is intended to the UE. In an embodiment of the present application, the time-frequency resource(s) may be physical resource block (PRB) and orthogonal frequency division multiplexing (OFDM) symbols.

In FIG. 3, the DCI 24 and the DCI 21 for scheduling the first PDSCH transmission 22 are transmitted in different CORESETs included in the first CORESET group. The DCI 26 for scheduling the second PDSCH transmission 23 is transmitted in a CORESET in the second CORESET group.

According to some embodiments of the present application, the downlink pre-emption configuration information may include a first indication (e.g., positionInDCI1 field) indicating a start position of a first pre-emption indication within the DCI 24 and a second indication (e.g., positionInDCI2 field) indicating a start position of a second pre-emption indication within the DCI 24. The first pre-emption indication may be 14-bit information indicating a portion of resources, (e.g., PRB(s) and OFDM symbol(s)) of the first PSDCH of the TRP 103*a* on which no transmission is intended to the UE. The second pre-emption indication may be 14-bit information indicating a portion of resources (i.e., PRB(s) and OFDM symbol(s)) of the second PDSCH of the TRP 103*b* on which no transmission is intended to the UE. The portion of resources of a PDSCH may refer to partial or all resources of the PDSCH.

After receiving the downlink pre-emption configuration information, the UE 105*b* may first obtain that the first pre-emption indication within the DCI 24 based on positionInDCI1 and obtain the second pre-emption indication within the DCI 24 based on positionInDCI2. In some embodiments of the present disclosure, the first pre-emption indication may be a continuous bitstream with 14 bits. The UE 105*b* may determine the start position of the first pre-emption indication within the DCI 24 based on positionInDCI1 field and then determine the continuous 14 bits from the start position indicated by positionInDCI1 field to be the first pre-emption indication. In some other embodiments of the present disclosure, the second pre-emption indication may be a continuous bitstream with 14 bits. The UE 105*b* may determine the start position of the second pre-emption indication within the DCI 24 based on positionInDCI2 field, and then determine the continuous 14 bits from the start position indicated by positionInDCI2 field to be the second pre-emption indication.

Since the DCI 24 including the first pre-emption indication and the second pre-emption indication and the DCI 21 for scheduling the first PDSCH transmission are in the same CORESET group, the UE 105b may determine that the first pre-emption indication is used for indicating a portion of resources of the first PDSCH on which no transmission is intended to the UE. Since the DCI 24 including the first pre-emption indication and the second pre-emption indication and the DCI 26 for scheduling the second PDSCH transmission are in different CORESET groups, the UE 105b may determine that the second pre-emption indication is used for indicating a portion of resources of the second PDSCH on which no transmission is intended to the UE. Thus, the UE may not decode the data transmission on the first PDSCH on the resource indicated by the first pre-emption indication and not decode the data transmission on the second PDSCH on the resource indicated by the second pre-emption indication.

In the case that no resource on the first PDSCH from the TRP 103a is pre-empted by the URLLC transmission, each bit of the first pre-emption indication may be set to 0 to indicate that no resource on the first PDSCH from the TRP 103a is pre-empted by the URLLC transmission. Similarly, in the case that no resource on the second PDSCH from the TRP 103b is pre-empted by the URLLC transmission, each bit of the second pre-emption indication may be set to 0 to indicate that no resource on the second PDSCH from the TRP 103b is pre-empted by the URLLC transmission.

For example, assuming that the DCI 21 schedules the first transmission 22 on PDSCH 1 and the DCI 26 schedules the second transmission 23 on PDSCH 2. The DCI 24 including the first pre-emption indication and the second pre-emption indication and the DCI 21 scheduling the first transmission 22 on PDSCH 1 are transmitted in CORESET group 1. The DCI 26 scheduling the second transmission 23 on PDSCH 2 is transmitted in CORESET group 2.

In the example, the downlink pre-emption configuration information may include positionInDCI1 field indicating a start position of a first pre-emption indication within DCI 24 and a positionInDCI2 field indicating a start position of a second pre-emption indication within the DCI 24. The first pre-emption indication may indicate a portion of resources of PDSCH 1 on which no transmission is intended to the UE. The second pre-emption indication may indicate a portion of resources of PDSCH 2 on which no transmission is intended to the UE. In the case that no resource on the PDSCH 1 from the TRP 103a is pre-empted by the URLLC transmission, each bit of the first pre-emption indication may be set to 0 to indicate that no resource on the PDSCH 1 from the TRP 103a is pre-empted by the URLLC transmission. In the case that no resource on the PDSCH 2 from the TRP 103b is pre-empted by the URLLC transmission, each bit of the second pre-emption indication may be set to 0 to indicate that no resource on the PDSCH 2 from the TRP 103b is pre-empted by the URLLC transmission.

After receiving the downlink pre-emption configuration information, the UE 105b may first obtain the first pre-emption indication within the DCI 24 based on positionInDCI1 field and obtain the second pre-emption indication within the DCI 24 based on positionInDCI2 field. Since the DCI 24 and the DCI 21 are transmitted in the same CORESET group 1, the UE 105b may determine that the first pre-emption indication is used for indicating a portion of resources of the PDSCH 1 on which no transmission is intended to the UE. Similarly, since the DCI 24 and the DCI 26 are transmitted in two different CORESET groups 1 and 2 respectively, the UE 105b may determine that the second pre-emption indication is used for indicating a portion of resources of the PDSCH 2 on which no transmission is intended to the UE.

According to some embodiments of the present application, the URLLC transmission may merely pre-empt resources of one of the TRP 103a and the TRP 103b. In the case, only one pre-emption indication may be enough for indicating the pre-empted resources of one TRP.

In this embodiment, the TRP 103a or the TRP 103b may transmit downlink pre-emption configuration information to the UE 105b. The downlink pre-emption configuration information may be the "DownlinkPreemption" information element (IE) as defined in TS38.331. The downlink pre-emption configuration information may include an indication indicating a start position of a pre-emption indication within a DCI 24, for example DCI format 2_1. The indication may be a positionInDCI1 field or positionInDCI2 field in the "DownlinkPreemption" information element (IE).

In the cast that positionInDCI1 field is included in the downlink pre-emption configuration information while positionInDCI2 field is empty, the pre-emption indication indicated by the positionInDCI1 field may indicate portion of resources (e.g., PRB(s) and OFDM symbol(s)) of the first PDSCH of the TRP 103a on which no transmission is intended to the UE.

In the cast that positionInDCI2 field is included in the downlink pre-emption configuration information while positionInDCI1 field is empty, the pre-emption indication indicated by the positionInDCI2 field may indicate a portion of resources (e.g., PRB(s) and OFDM symbol(s)) of the second PDSCH of the TRP 103b on which no transmission is intended to the UE.

After receiving the downlink pre-emption configuration information, the UE 105b may first obtain that the pre-emption indication within the DCI 24 based on positionInDCI1 field or positionInDCI2 field. In some embodiments of the present disclosure, the pre-emption indication may be a continuous bitstream with 14 bits. The UE 105b may determine the start position of the pre-emption indication within the DCI 24 based on positionInDCI1 field or positionInDCI2 field and then determine the continuous 14 bits from the start position indicated by positionInDCI1 field or positionInDCI2 field to be the pre-emption indication.

In the case that the pre-emption indication is obtained based on positionInDCI1 field, the UE 105b may associate the pre-emption indication with the first CORESET group in which the DCI 24 and the DCI 21 are transmitted, and thus the UE 105b may determine that the pre-emption indication is used for indicating a portion of resources of the first PDSCH scheduled by the DCI 21 on which no transmission is intended to the UE.

Similarly, in the case that the pre-emption indication is obtained based on positionInDCI2 field, the UE may associate the pre-emption indication with the second CORESET group which is different from the first CORESET group in which the DCI 24 is transmitted, and thus the UE 105b may determine that the pre-emption indication is used for indicating a portion of resources of the second PDSCH scheduled by the DCI 26 in the second CORESET group on which no transmission is intended to the UE.

For example, assuming that the DCI 21 schedules the first transmission 22 on PDSCH 1 and the DCI 26 schedules the second transmission 23 on PDSCH 2, the DCI 24 including the first pre-emption indication and the second pre-emption indication and the DCI 21 scheduling the first transmission 22 on PDSCH 1 are transmitted in CORESET group 1. The DCI 26 scheduling the second transmission 23 on PDSCH 2 is transmitted in CORESET group 2.

In the example, in the case that only resources on PDSCH 1 are pre-empted by the URLLC transmission 25, the downlink pre-emption configuration information may merely include positionInDCI1 field. In the case that only resources on PDSCH 2 are pre-empted by the URLLC transmission 25, the downlink pre-emption configuration information may merely include positionInDCI2 field.

After receiving the downlink pre-emption configuration information, the UE 105b may first obtain the pre-emption indication within the DCI 24 based on positionInDCI1 field or positionInDCI2 field. In the case that the pre-emption indication is obtained based on the positionInDCI1 field, the UE 105b may associate the pre-emption indication with the CORESET group 1, then the UE 105b may determine that the pre-emption indication is used for indicating a portion of resources of the PDSCH 1 of the TRP 103a on which no transmission is intended to the UE.

Similarly, in the case that the pre-emption indication is obtained based on the positionInDCI2 field, the UE 105b may associate the pre-emption indication with the CORESET group 2, then the UE 105b may determine that the pre-emption indication is used for indicating a portion of resources of the PDSCH 2 of the TRP 103b on which no transmission is intended to the UE.

According to some embodiments of the present application, regardless of whether one or two indications of one serving cell for indicating position(s) of pre-emption indication(s) within a DCI 24 are included in the downlink pre-emption configuration information, the TRP 103a or the TRP 103b may transmit configuration information associating the indication(s) with CORESET group(s).

In an embodiment of the present application, the downlink pre-emption configuration information may include a first indication (e.g., positionInDCI1 field) indicating a start position of a first pre-emption indication within a DCI 24 (e.g., DCI format 2_1) and a second indication (e.g., positionInDCI2 field) indicating a start position of a second pre-emption indication within the DCI 24. In this case, the TRP 103a or the TRP 103b may transmit configuration information associating the first indication with one of the first CORESET group and the second CORESET group and associating the second indication with the other one of the first CORESET group and the second CORESET group.

After receiving the downlink pre-emption configuration information, the UE 105b may first obtain the first pre-emption indication within the DCI 24 based on positionInDCI1 field and obtain the second pre-emption indication within the DCI 24 based on positionInDCI2 field. In some embodiments of the present disclosure, the first pre-emption indication may be a continuous bitstream with 14 bits. The UE 105b may determine the start position of the first pre-emption indication within the DCI 24 based on positionInDCI1 field and then determine the continuous 14 bits from the start position indicated by positionInDCI1 field to be the first pre-emption indication. In some other embodiments of the present disclosure, the second pre-emption indication may be a continuous bitstream with 14 bits. The UE 105b may determine the start position of the second pre-emption indication within the DCI 24 based on positionInDCI2 field, and then determine the continuous 14 bits from the start position indicated by positionInDCI2 field to be the second pre-emption indication.

Based on the configuration information, the UE 105b may determine that the first pre-emption indication indicated by the positionInDCI1 field is associated with the one of the first CORESET group and the second CORESET group and associating the second indication with the other one of the first CORESET group and the second CORESET group. Since the DCI 21 for scheduling the first PDSCH is transmitted in the first CORESET group and the DCI 26 for scheduling the second PDSCH is transmitted in the second CORESET group, which implies that the first PDSCH is associated with the first CORESET group and the second PDSCH is associated with the second CORESET group.

Accordingly, the UE 105b may determine that the first pre-emption indication may indicate a portion of resources of one of the first PDSCH and the second PDSCH associated with the one CORESET group which is associated with the first indication on which no transmission is intended to the UE. The UE 105b may also determine that the second pre-emption indication may indicate a portion of resources of the other one of the first PDSCH and the second PDSCH on which no transmission is intended to the UE.

In another embodiment of the present application, the downlink pre-emption configuration information may only include one indication, for example positionInDCI field indicating a start position of a pre-emption indication within a DCI 24. In this embodiment, the TRP 103a or the TRP 103b may transmit configuration information associating the indication with one of the first CORESET group and the second CORESET group.

After receiving the downlink pre-emption configuration information, the UE 105b may first obtain the pre-emption indication within the DCI 24 based on positionInDCI field. Based on the configuration information, the UE 105b may determine that the pre-emption indication indicated by the positionInDCI field is associated with one of the first CORESET group and the second CORESET group.

As stated above, the first PDSCH is associated with the first CORESET group and the second PDSCH is associated with the second CORESET group. Given this, the UE 105b may determine that the pre-emption indication may indicate a portion of resources of the one of the first PDSCH and the second PDSCH associated with the one CORESET group which is associated with the indication on which no transmission is intended to the UE.

According to some embodiments of the present application, the URLLC transmission may merely pre-empt resources of one of the TRP 103a and the TRP 103b. In these embodiments, only one pre-emption indication may be enough for indicating the pre-empted resources of one TRP.

In these embodiments, the TRP 103a or the TRP 103b may transmit downlink pre-emption configuration information to the UE 105b. The downlink pre-emption configuration information may be the "DownlinkPreemption" information element (IE) as defined in TS38.331. The downlink pre-emption configuration information may include an indication indicating a start position of a pre-emption indication within a DCI 24, for example DCI format 2_1.

In these embodiments embodiment, the pre-emption indication may include an indicator which indicates that the pre-emption indication is associated with one of the first TCI CORESET group or the second CORESET group. According to some embodiments of the present application, the pre-emption indication may be a continuous bitstream with 14 bits plus the size (e.g., one or more bits) of the indicator. In one embodiment of the present application, the indicator may be 1-bit information with a value "0" or "1". For example, "0" may indicate that the pre-emption indication is associated with the first CORESET group. "1" may indicate that the pre-emption indication is associated with the second CORESET group. In another embodiment, "1" may indicate that the pre-emption indication is associated with the first CORESET group. "0" may indicate that the pre-emption indication is associated with the second CORESET group. In this embodiment, the pre-emption indication may have 15 bits, in which 14 bits are used for indicating the resource(s) of a PDSCH on which no transmission is intended to the UE and 1 bit is used to indicate the pre-emption indication is associated with one CORESET group of the first CORESET group or the second CORESET group.

After receiving the downlink pre-emption configuration information, the UE 105b may first obtain the pre-emption indication within the DCI 24 based on positionInDCI field. In some embodiments of the present disclosure, the pre-emption indication may be a continuous bitstream with 14 bits plus the size (e.g., one or more bits) of the indicator. The UE 105b may determine the start position of the pre-emption indication within the DCI 24 based on positionInDCI1 field and then determine the continuous 14 bits plus the size (e.g., one or more bits) of the indicator from the start position indicated by positionInDCI1 field to be the pre-emption indication.

Based on the indicator included in the pre-emption indication, the UE 105b may determine that the pre-emption indication is associated with one of the first CORESET group and the second CORESET group indicated by indicator.

As stated above, the first CORESET group may be associated with the first PDSCH and the second CORESET group may be associated with the second PDSCH. Given this, the UE 105b may determine that the pre-emption indication may indicate a portion of resources of the one of the first PDSCH and the second PDSCH associated with the one CORESET group which is indicated by the indicator on which no transmission is intended to the UE.

Figure 4:
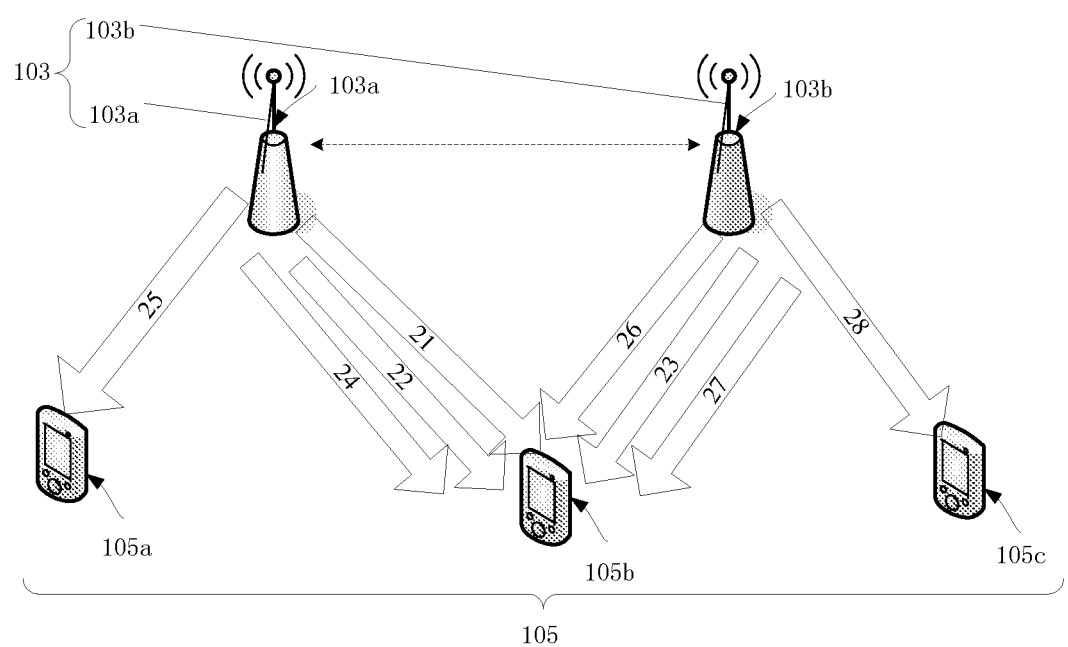
FIG. 4 illustrates a scenario of pre-emption indication in multi-TRP transmission according to yet some other embodiments of the present application.

FIG. 4 illustrates a scenario of pre-emption indication in multi-TRP transmission according to yet some other embodiments of the present application;

Referring to FIG. 4, the wireless communication system may include two TRPs 103 (e.g., a TRP 103a and a TRP 103b), and three UEs 105 (e.g., a UE 105a, a UE 105b, and a UE 105c). The UE 105b may be a UE having relatively great tolerance of transmission delay or latency, for example an eMBB UE. Each of the UE 105a and the UE 105c may be a UE have relatively less tolerance of transmission delay or latency, for example an URLLC UE.

Both of the TRP 103a and 103b can serve the UE 105b. The TRP 103a may also serve the UE 105a. The TRP 103b may also serve the UE 105c.

As shown in FIG. 4, the TRP 103a may transmit DCI 21 for scheduling a first transmission 22 on a first PDSCH (i.e., a first PDSCH transmission) from the TRP 103a to the UE 105b. The TRP 103b may transmit DCI 26 for scheduling a second transmission 23 on a second PDSCH from the TRP 103b to the UE 105b.

The TRP 103a or the TRP 103b may also transmit configuration information indicating a first control-resource set (CORESET) group for the TRP 103a and a second CORESET group for the TRP 103b.

According to some embodiments of the present application, the configuration information may directly include the first CORESET group for the TRP 103a and the second CORESET group for the TRP 103b. The first CORESET group may include one or more CORESETs. The second CORESET group may include one or more CORESETs which are different from the CORESETs included in the first CORESET group.

According to some other embodiments of the present application, the configuration information may include one or more high layer indexes, each of the one or more high layer indexes may be associated with one CORESET. After receiving the configuration information, the UE may determine that the CORESETs with the same high layer index are in a CORESET group.

During the instant of PDSCH transmission 22 and PDSCH transmission 23 to the UE 105b, an URLLC transmission 25 to the UE 105a and an URLLC transmission 28 to the UE 105c may arrive at the TRP 103a and the TRP 103b. Assuming that there is no enough resource for non-overlapping transmission to the UE 105b and URLLC transmission to the UE 105a and the UE 105c, the URLLC transmission will pre-empt a portion of resources of the first PDSCH from the TRP 103a and a portion of resources of the second PDSCH from the TRP 103b.

To indicate the pre-empted resources of the TRP 103a and the TRP 103b to the UE 105b, the TRP 103a may transmit first downlink pre-emption configuration information to the UE 105b and the TRP 103b may transmit second downlink pre-emption configuration information to the UE 105b. Each of the first and second downlink pre-emption configuration information may be included in a plurality of high layer parameters configured by a high layer by a base station 101. For example, the high layer may represent a layer higher than the PHY (physical) layer, such as a RRC (Radio Resource Control) layer. Each of the first and second downlink pre-emption configuration information may be a "DownlinkPreemption" information element (IE) as defined in TS38.331.

Different from the scenarios in FIGS. 2 and 3, in FIG. 4, both of the TRP 103a and the TRP 103b are configured with a common search space. Therefore, the TRP 103a may transmit DCI 24 (e.g., DCI format 2_1) including one or more pre-emption indications. The TRP 103b may transmit DCI 27, for example, DCI format 2_1 including one or more pre-emption indications. The size of each of the DCI 24 and DCI 27 may be configured by the high layer and up to 126 bits. Each of the one or more pre-emption indications may be 14-bit information indicating a portion of resources of a PDSCH (e.g., PRB(s) and OFDM symbol(s)) on which no transmission is intended to the UE.

In FIG. 4, the DCI 21 and the DCI 24 are transmitted in different CORESETs included in the first CORESET group and the DCI 26 and the DCI 27 are transmitted in different CORESETs in the second CORESET group.

According to some embodiments of the present application, the first downlink pre-emption configuration information may include a first indication (e.g., positionInDCI field) indicating a start position of the first pre-emption indication within the DCI 24. The second downlink pre-emption configuration information may include a second indication (e.g., positionInDCI field) indicating a start position of the second pre-emption indication within the DCI 27. The first pre-emption indication may be 14-bit information indicating a portion of resources (e.g., PRB(s) and OFDM symbol(s)) of the first PSDCH of the TRP 103a on which no transmission is intended to the UE. The second pre-emption indication may be 14-bit information indicating a portion of resources (PRB(s) and OFDM symbol(s)) of the second PDSCH of the TRP 103b on which no transmission is intended to the UE. The portion of resources of a PDSCH may refer to partial or all resources of the PDSCH.

In addition, the first downlink pre-emption configuration information may also include an int-RNTI field as defined in TS 38. 331 for indicating the Interruption-Radio Network Temporary Identity (INT-RNTI) for monitoring physical downlink control channel (PDCCH) conveying the DCI 24, a set of int-ConfigurationPerServingCell fields with each int-ConfigurationPerServingCell indicating a serving cell index as defined in TS 38. 331, and dci-PayloadSize field as defined in TS 38. 331 for indicating a payload size for DCI 24.

The second downlink pre-emption configuration information may also include an int-RNTI field as defined in TS 38. 331 for indicating the Interruption-Radio Network Temporary Identity (INT-RNTI) for monitoring physical downlink control channel (PDCCH) conveying the DCI 27, a set of int-ConfigurationPerServingCell fields with each int-ConfigurationPerServingCell field indicating a serving cell index as defined in TS 38. 331, and dci-PayloadSize field as defined in TS 38. 331 for indicating a payload size for DCI 27.

After receiving the first and the second downlink pre-emption configuration information, the UE 105b may first obtain that the first pre-emption indication within the DCI 24 based on the first indication and obtain the second pre-emption indication within the DCI 27 based on the second indication. In some embodiments of the present disclosure, the first pre-emption indication may be a continuous bitstream with 14 bits. The UE 105b may determine the start position of the first pre-emption indication within the DCI 24 based on the first indication and then determine the continuous 14 bits from the start position indicated by the first indication to be the first pre-emption indication. In some other embodiments of the present disclosure, the second pre-emption indication may be a continuous bitstream with 14 bits. The UE 105b may determine the start position of the second pre-emption indication within the DCI 27 based on the second indication, and then determine the continuous 14 bits from the start position indicated by the second indication to be the second pre-emption indication.

Since the DCI 24 including the first pre-emption indication and the DCI 21 for scheduling the first PDSCH transmission are in the same CORESET group (i.e., the first CORESET group), the UE 105b may determine that the first pre-emption indication in DCI 24 is used for indicating a portion of resources of the first PDSCH on which no transmission is intended to the UE.

Similarly, since the DCI 27 including the second pre-emption indication and the DCI 26 for scheduling the second PDSCH transmission are in the same CORESET group (i.e., the second CORESET group), the UE 105b may determine that the second pre-emption indication in DCI 27 is used for indicating a portion of resources of the second PDSCH on which no transmission is intended to the UE.

Thus, the UE may not decode the data transmission on the first PDSCH on the resource indicated by the first pre-emption indication and not decode the data transmission on the second PDSCH on the resources indicated by the second pre-emption indication.

Figure 5:
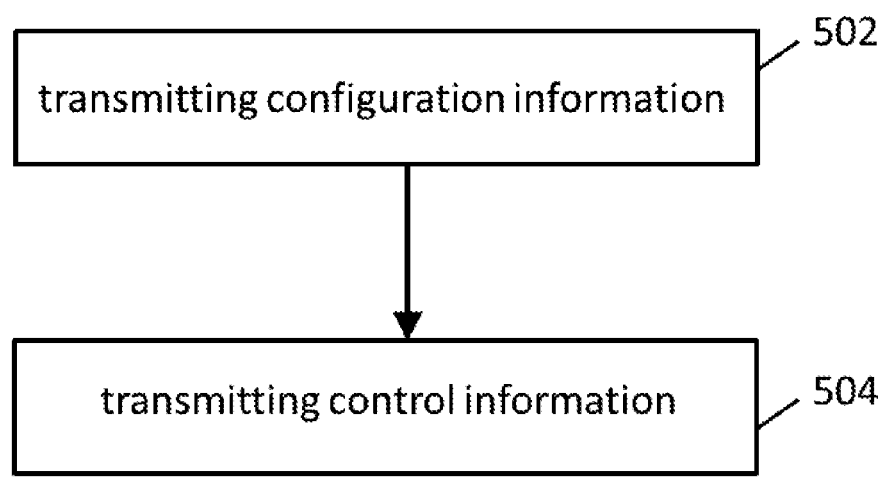
FIG. 5 illustrates a method for pre-emption indication in multi-TRP transmission according to some embodiments of the present application.

FIG. 5 illustrates a method for pre-emption indication in multi-TRP transmission according to some embodiments of the present application. The method may be performed by the TRP 103a or the TRP 103b as shown in FIGS. 2-4.

As shown in FIG. 5, in step 502, the TRP 103a or the TRP 103b may transmit configuration information to a UE, for example, the UE 105b as shown in FIGS. 2-4. The configuration information may be downlink pre-emption configuration information which may include a first indication indicating a start position of a first pre-emption indication within a first DCI.

In step 504, the TRP 103a may transmit control information to the UE, for example, the UE 105b as shown in FIGS. 2-4. The control information may be the first DCI including the first pre-emption indication.

According to some embodiments of the present application, as shown in FIG. 2, the TRP 103a may also transmit second DCI for scheduling a PDSCH transmission and for indicating a first TCI state and a second TCI state. The first TCI state may be associated with a first set of CDM groups including a first set of DMRS ports of the TRP 103a and a second TCI state is associated with a second set of CDM groups including a second set of DMRS ports of the TRP 103b. The PDSCH transmission may include a first data transmission on a first set of layers transmitted from the first set of DMRS ports and a second transmission on a second set of layers transmitted from the second set of DMRS ports.

In an embodiment of the present application, the first DCI may further include a second pre-emption indication, and the downlink pre-emption configuration information may further include a second indication indicating a start position of the second pre-emption indication within the first DCI. The first pre-emption indication may indicate a portion of resources of the first set of layers on which no transmission is intended to the UE. The second pre-emption indication may indicate a portion of resources of the second set of layers on which no transmission is intended to the UE.

In another embodiment of the present application, the first DCI may merely include one pre-emption indication, i.e., the first pre-emption indication. In this case, whether the first pre-emption indication indicate a portion of resources of the first set of layers on which no transmission is intended to the UE or a portion of resources of the second set of layers on which no transmission is intended to the UE may be determined based on the whether the first indication in the downlink pre-emption configuration information is position-InDCI1 field or positionInDCI2 field. As illustrated in some embodiments in FIG. 2, in the case that the positionInDCI1 field is included in the downlink pre-emption configuration information, the first pre-emption indication may indicate a portion of resources of the first set of layers on which no transmission is intended to the UE. In the case that the positionInDCI2 field is included in the downlink pre-emption configuration information, the first pre-emption indication may indicate a portion of resources of the second set of layers on which no transmission is intended to the UE.

In yet another embodiment of the present application, the first DCI may merely include one pre-emption indication, i.e., the first pre-emption indication. In this embodiment, the TRP 103a or the TRP 103b may transmit configuration information associating the first indication with one TCI state of the first TCI state and the second TCI state. As stated in the embodiments in FIG. 2, the first TCI state may be associated with the first set of layers and the second TCI state may be associated with the second set layers. Based on this, the first pre-emption indication indicates a portion of resources of one of the first set of layers and the second set of layers associated with the one TCI state which is associated with the first indication on which no transmission is intended to the UE.

In yet another embodiment of the present application, the first DCI further may include a second pre-emption indication, and the downlink pre-emption configuration information further may include a second indication indicating a start position of the second pre-emption indication within the first DCI. In this embodiment, the TRP 103*a* or the TRP 103*b* may transmit configuration information associating the first indication with one TCI state of the first TCI state and the second TCI state and associating the second indication with the other TCI state of the first TCI state and the second TCI state. The first pre-emption indication indicates a portion of resources of one of the first set of layers and the second set of layers associated with the one TCI state which is associated with the first indication on which no transmission is intended to the UE. The second pre-emption indication indicates a portion of resources of the other one of the first set of layers and the second set of layers associated with the other TCI state on which no transmission is intended to the UE.

In yet another embodiment of the present application, the first pre-emption indication may include an indicator, for example, 1-bit information as illustrated in the embodiment in FIG. 2 which indicates that the first pre-emption indication is associated with one TCI state of the first TCI state or the second TCI state. As stated in the embodiments in FIG. 2, the first TCI state may be associated with the first set of layers and the second TCI state may be associated with the second set layers. Based on this, the first pre-emption indication may indicate a portion of resources of one of the first set of layers and the second set of layers associated with the one TCI state which is indicated by the indicator on which no transmission is intended to the UE.

According to some embodiments of the present application, as shown in FIG. 3, the TRP 103*a* or the TRP 103*b* may also transmit configuration information indicating a first CORESET group for the TRP 103*a* and a second CORESET group for the TRP 103*b*. Each of the first CORESET group and the second CORESET group may include a one or more CORESETs with the same high layer index. The first DCI and a second DCI for scheduling a first PDSCH transmission from the TRP 103*a* are transmitted in the first CORESET group. The third DCI for scheduling a second PDSCH transmission from the TRP 103*b* is transmitted in the second CORESET group.

In an embodiment of the present application, the first DCI may further include a second pre-emption indication, and the downlink pre-emption configuration information may further include a second indication indicating a start position of the second pre-emption indication within the first DCI. The first pre-emption indication indicates a portion of resources of the first PDSCH on which no transmission is intended to the UE. The second pre-emption indication indicates a portion of resources of the second PDSCH on which no transmission is intended to the UE.

In another embodiment of the present application, the first DCI may merely include one pre-emption indication, i.e., the first pre-emption indication. In this case, whether the first pre-emption indication indicate a portion of resources of the first PDSCH on which no transmission is intended to the UE or a portion of resources of the second PDSCH on which no transmission is intended to the UE may be determined based on the whether the first indication in the downlink pre-emption configuration information is positionInDCI1 field or positionInDCI2 field. As illustrated in some embodiments in FIG. 3, in the case that the positionInDCI1 field is included in the downlink pre-emption configuration information, the first pre-emption indication may indicate a portion of resources of the first PDSCH on which no transmission is intended to the UE. In the case that the positionInDCI2 field is included in the downlink pre-emption configuration information, the first pre-emption indication may indicate a portion of resources of the second PDSCH on which no transmission is intended to the UE.

In yet another embodiment of the present application, the first DCI may merely include one pre-emption indication, i.e., the first pre-emption indication. In this case, the TRP 103*a* or the TRP 103*b* may transmit configuration information associating the first indication with one CORESET group of the first CORESET group and the second CORESET group. As stated in the embodiments in FIG. 3, the first CORESET group may be associated with the first PDSCH and the second CORESET group may be associated with the second PDSCH. Based on this, the first pre-emption indication indicates a portion of resources of one of the first PDSCH and the second PDSCH associated with the one CORESET group which is associated with the first indication on which no transmission is intended to the UE.

In yet another embodiment of the present application, the first DCI further may include a second pre-emption indication, and the downlink pre-emption configuration information further may include a second indication indicating a start position of the second pre-emption indication within the first DCI. In this case, the TRP 103*a* or the TRP 103*b* may transmit configuration information associating the first indication with one of the first CORESET group and the second CORESET group and associating the second indication with the other one of the first CORESET group and the second CORESET group. The first pre-emption indication indicates a portion of resources of one of the first PDSCH and the second PDSCH associated with the one CORESET group on which no transmission is intended to the UE. The second pre-emption indication indicates a portion of resources of the other one of the first PDSCH and the second PDSCH on which no transmission is intended to the UE.

In yet another embodiment of the present application, the first pre-emption indication may include an indicator, for example, 1-bit information as illustrated in the embodiment in FIG. 3 which indicates that the first pre-emption indication is associated with one CORESET group of the first CORESET group and the second CORESET group. As stated in the embodiments in FIG. 3, the first CORESET group may be associated with the first PDSCH and the second CORESET group may be associated with the second PDSCH. Based on this, the first pre-emption indication indicates a portion of resources of one of the first PDSCH and the second PDSCH associated with the one CORESET group which is indicated by the indicator on which no transmission is intended to the UE.

Figure 6:
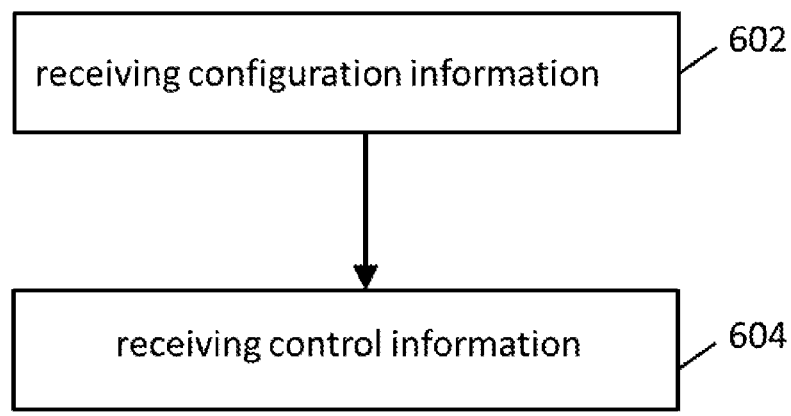
FIG. 6 illustrates a method for pre-emption indication in multi-TRP transmission according to some other embodiments of the present application.

FIG. 6 illustrates a method for pre-emption indication in multi-TRP transmission according to some other embodiments of the present application. The method may be performed by the UE 105*b* as shown in FIGS. 2-4.

As shown in FIG. 6, in step 602, the UE 105*b* may receive configuration information from the TRP 103*a* or the TRP 103*b* as shown in FIGS. 2-4. The configuration information may be the first downlink pre-emption configuration information which may include a first indication indicating a start position of a first pre-emption indication within a first DCI.

In step 604, the UE 105*b* may receive control information from the TRP 103*a* or the TRP 103*b* as shown in FIGS. 2-4. The control information may be the first DCI including the first pre-emption indication.

According to some embodiments of the present application, as shown in FIG. 2, the UE 105*b* may also receive a second DCI for scheduling a PDSCH transmission and for indicating a first TCI state and a second TCI state. The first TCI state may be associated with a first set of CDM groups including a first set of DMRS ports of the TRP 103a and a second TCI state is associated with a second set of CDM groups including a second set of DMRS ports of the TRP 103b. The PDSCH transmission may include a first data transmission on a first set of layers transmitted from the first set of DMRS ports and a second transmission on a second set of layers transmitted from the second set of DMRS ports.

In an embodiment of the present application, the first DCI may further include a second pre-emption indication, and the first downlink pre-emption configuration information may further include a second indication indicating a start position of the second pre-emption indication within the first DCI. The first pre-emption indication may indicate a portion of resources of the first set of layers on which no transmission is intended to the UE. The second pre-emption indication may indicate a portion of resources of the second set of layers on which no transmission is intended to the UE.

In another embodiment of the present application, the first DCI may merely include one pre-emption indication, i.e., the first pre-emption indication. In this case, whether the first pre-emption indication indicate a portion of resources of the first set of layers on which no transmission is intended to the UE or a portion of resources of the second set of layers on which no transmission is intended to the UE may be determined based on the whether the first indication in the first downlink pre-emption configuration information is positionInDCI1 field or positionInDCI2 field. As illustrated in some embodiments in FIG. 2, in the case that the positionInDCI1 field is included in the first downlink pre-emption configuration information, the first pre-emption indication may indicate a portion of resources of the first set of layers on which no transmission is intended to the UE. In the case that the positionInDCI2 field is included in the first downlink pre-emption configuration information, the first pre-emption indication may indicate a portion of resources of the second set of layers on which no transmission is intended to the UE.

In yet another embodiment of the present application, the first DCI may merely include one pre-emption indication, i.e., the first pre-emption indication. In this case, the UE 105b may receive configuration information associating the first indication with one TCI state of the first TCI state and the second TCI state from the TRP 103a or the TRP 103b. As stated in the embodiments in FIG. 2, the first TCI state may be associated with the first set of layers and the second TCI state may be associated with the second set layers. Based on this, the first pre-emption indication may indicate a portion of resources of one of the first set of layers and the second set of layers associated with the one TCI state which is associated with the first indication on which no transmission is intended to the UE.

In yet another embodiment of the present application, the first DCI further may include a second pre-emption indication, and the first downlink pre-emption configuration information further may include a second indication indicating a start position of the second pre-emption indication within the first DCI. In this case, the UE 105b may receive configuration information associating the first indication with one TCI state of the first TCI state and the second TCI state and associating the second indication with the other TCI state of the first TCI state and the second TCI state from the TRP 103a or the TRP 103b The first pre-emption indication indicates a portion of resources of one of the first set of layers and the second set of layers associated with the one TCI state which is associated with first indication on which no transmission is intended to the UE. The second pre-emption indication indicates a portion of resources of the other one of the first set of layers and the second set of layers associated with the other TCI state on which no transmission is intended to the UE.

In yet another embodiment of the present application, the first pre-emption indication may include an indicator, for example, 1-bit information as illustrated in the embodiment in FIG. 2 which indicates that the first pre-emption indication is associated with one TCI state of the first TCI state or the second TCI state. As stated in the embodiments in FIG. 2, the first TCI state may be associated with the first set of layers and the second TCI state may be associated with the second set layers. Based on this, the first pre-emption indication may indicate a portion of resources of one of the first set of layers and the second set of layers associated with the one TCI state which is indicated by the indicator on which no transmission is intended to the UE.

According to some embodiments of the present application, as shown in FIG. 3, the UE 105b may receive configuration information indicating a first CORESET group for the TRP 103a and a second CORESET group for the TRP 103b from the TRP 103a or the TRP 103b. Each of the first CORESET group and the second CORESET group may include a one or more CORESETs with the same high layer index. The first DCI and a second DCI for scheduling a first PDSCH transmission from the TRP 103a are transmitted in the first CORESET group. The third DCI for scheduling a second PDSCH transmission from the TRP 103b is transmitted in the second CORESET group.

In an embodiment of the present application, the first DCI may further include a second pre-emption indication, and the first downlink pre-emption configuration information may further include a second indication indicating a start position of the second pre-emption indication within the first DCI. The first pre-emption indication indicates a portion of resources of the first PDSCH on which no transmission is intended to the UE. The second pre-emption indication indicates a portion of resources of the second PDSCH on which no transmission is intended to the UE.

In another embodiment of the present application, the first DCI may merely include one pre-emption indication, i.e., the first pre-emption indication. In this case, whether the first pre-emption indication indicate a portion of resources of the first PDSCH on which no transmission is intended to the UE or a portion of resources of the second PDSCH on which no transmission is intended to the UE may be determined based on the whether the first indication in the first downlink pre-emption configuration information is positionInDCI1 field or positionInDCI2 field. As illustrated in some embodiments in FIG. 3, in the case that the positionInDCI1 field is included in the first downlink pre-emption configuration information, the first pre-emption indication may indicate a portion of resources of the first PDSCH on which no transmission is intended to the UE. In the case that the positionInDCI2 field is included in the first downlink pre-emption configuration information, the first pre-emption indication may indicate a portion of resources of the second PDSCH on which no transmission is intended to the UE.

In yet another embodiment of the present application, the first DCI may merely include one pre-emption indication, i.e., the first pre-emption indication. In this case, the UE 105b may receive configuration information associating the first indication with one CORESET group of the first CORESET group and the second CORESET group from the TRP 103a or the TRP 103b. As stated in the embodiments in FIG. 3, the first CORESET group may be associated with the first PDSCH and the second CORESET group may be associated with the second PDSCH. Based on this, the first pre-emption indication indicates a portion of resources of one of the first PDSCH and the second PDSCH associated with the one CORESET group which is associated with the first indication on which no transmission is intended to the UE.

In yet another embodiment of the present application, the first DCI further may include a second pre-emption indication, and the first downlink pre-emption configuration information further may include a second indication indicating a start position of the second pre-emption indication within the first DCI. In this case, the UE 105b may receive configuration information associating the first indication with one of the first CORESET group and the second CORESET group and associating the second indication with the other one of the first CORESET group and the second CORESET group from the TRP 103a or the TRP 103b. The first pre-emption indication indicates a portion of resources of one of the first PDSCH and the second PDSCH associated with the one CORESET group on which no transmission is intended to the UE. The second pre-emption indication indicates a portion of resources of the other one of the first PDSCH and the second PDSCH on which no transmission is intended to the UE.

In yet another embodiment of the present application, the first pre-emption indication may include an indicator, for example, 1-bit information as illustrated in the embodiment in FIG. 3 which indicates that the first pre-emption indication is associated with one CORESET group of the first CORESET group and the second CORESET group. Based on this, the first pre-emption indication indicates a portion of resources of one of the first PDSCH and the second PDSCH associated with the one CORESET group which is indicated by the indicator on which no transmission is intended to the UE.

According to some embodiments of the present application, as shown in FIG. 4, the UE 105b may receive second downlink pre-emption configuration information from the TRP 103b. The second downlink pre-emption configuration information may include a second indication indicating a start position of a second pre-emption indication within a forth DCI. The UE 105b may receive the forth DCI including the second pre-emption indication from the TRP 103b as shown in FIG. 4.

In addition, the UE 105b may also receive configuration information indicating a first CORESET group for the TRP 103a and a second CORESET group for the TRP 103b from the TRP 103a or the TRP 103b. Each of the first CORESET group and the second CORESET group may include a plurality of CORESETs with the same high layer index.

The UE 105b may receive the first DCI and the third DCI in the first CORESET group and receive the second DCI and the fourth DCI in the second CORESET group, then the UE may determine that the first pre-emption indication included in the first DCI indicates a portion of resources of the first PDSCH scheduled by the first DCI on which no transmission is intended to the UE and the second pre-emption indication included in the second indicates a portion of resources of the second PDSCH scheduled by the fourth DCI on which no transmission is intended to the UE.

Figure 7:
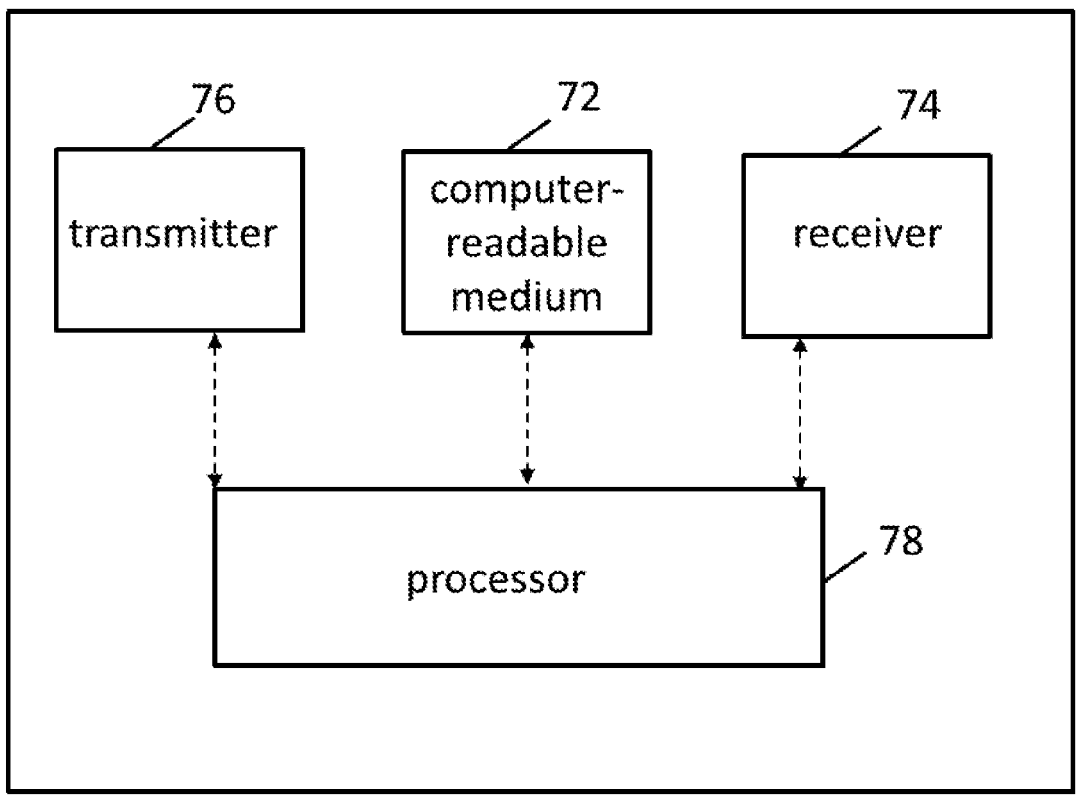
FIG. 7 illustrates a simplified block diagram of an apparatus for pre-emption indication in multi-TRP transmission according to some embodiments of the present application.

FIG. 7 illustrates a simplified block diagram of an apparatus for pre-emption indication in multi-TRP transmission according to some embodiments of the present application. The apparatus 700 may be a TRP 103a or a TRP 103b as shown in FIGS. 2-4.

Referring to FIG. 7, the apparatus 700 may include at least one non-transitory computer-readable medium 72, at least one receiver 74, at least one transmitter 76, and at least one processor 78. In some embodiment of the present application, at least one receiver 74 and at least one transmitter 76 and be integrated into at least one transceiver. The at least one non-transitory computer-readable medium 72 may have computer executable instructions stored therein. The at least one processor 78 may be coupled to the at least one non-transitory computer-readable medium 72, the at least one receiver 74 and the at least one transmitter 76. The computer executable instructions can be programmed to implement a method with the at least one receiver 74, the at least one transmitter 76 and the at least one processor 78. The method can be a method according to an embodiment of the present application, for example, the method shown in FIG. 5.

Figure 8:
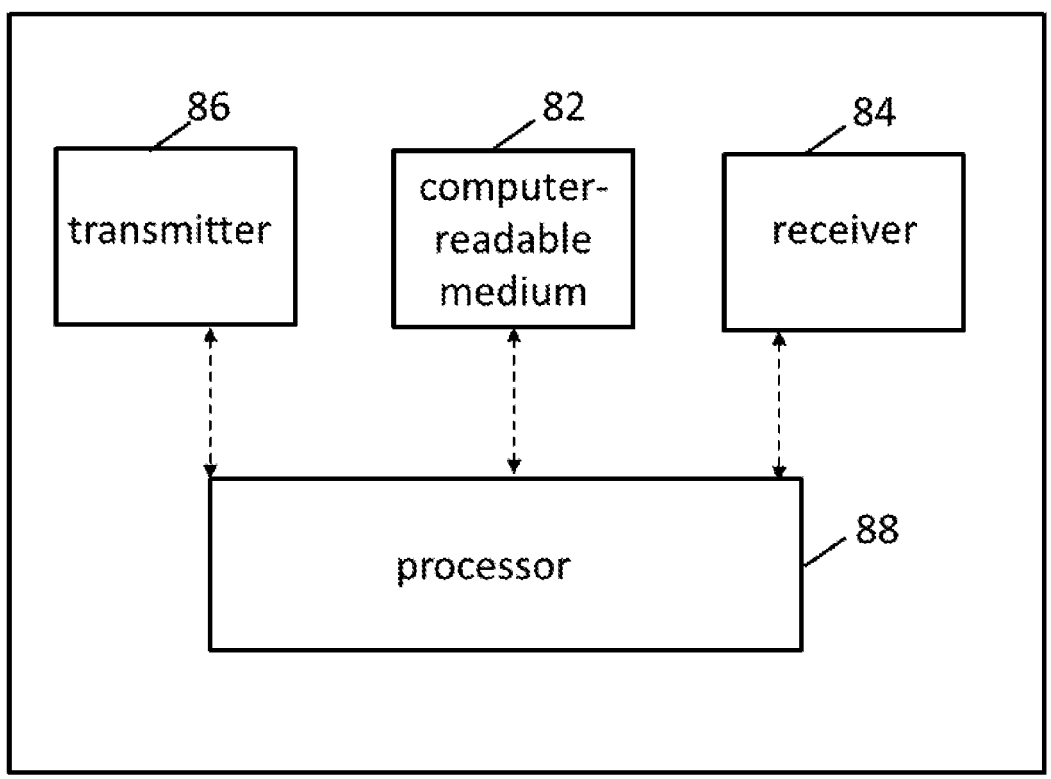
FIG. 8 illustrates a simplified block diagram of an apparatus for pre-emption indication in multi-TRP transmission according to some other embodiments of the present application.

FIG. 8 illustrates a simplified block diagram of an apparatus for pre-emption indication in multi-TRP transmission according to some other embodiments of the present application. The apparatus 800 may be a UE 105b as shown in FIGS. 2-4.

Referring to FIG. 8, the apparatus 800 may include at least one non-transitory computer-readable medium 82, at least one receiver 84, at least one transmitter 86, and at least one processor 88. In some embodiment of the present application, at least one receiver 84 and at least one transmitter 86 and be integrated into at least one transceiver. The at least one non-transitory computer-readable medium 82 may have computer executable instructions stored therein. The at least one processor 88 may be coupled to the at least one non-transitory computer-readable medium 82, the at least one receiver 84 and the at least one transmitter 86. The computer executable instructions can be programmed to implement a method with the at least one receiver 84, the at least one transmitter 86 and the at least one processor 88 The method can be a method according to an embodiment of the present application, for example, the method shown in FIG. 6.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A base station, comprising:
at least one memory; and
at least one processor coupled with the at least one memory and configured to cause the base station to:
transmit downlink pre-emption configuration information to a user equipment (UE), wherein the downlink pre-emption configuration information comprises a first indication indicating a start position of a first pre-emption indication within first downlink control information (DCI);
transmit the first DCI comprising the first pre-emption indication to the UE; and
transmit a second DCI for scheduling a physical downlink shared channel (PDSCH) transmission and for indicating a first transmission configuration indicator (TCI) state and a second TCI state;
wherein the first pre-emption indication in the first DCI comprises an indicator which indicates that the first pre-emption indication is associated with one TCI state of the first TCI state or the second TCI state.

2. The base station of claim 1, wherein:
the first TCI state is associated with a first set of code division multiplexing (CDM) groups comprising a first set of demodulation reference signal (DMRS) ports and a second TCI state is associated with a second set of CDM groups comprising a second set of DMRS ports;
the indicator further indicates a portion of resources of one of the first set of layers and the second set of layers associated with the one TCI state on which no transmission is intended to the UE; and
the PDSCH transmission comprising a first data transmission on a first set of layers transmitted from the first set of DMRS ports and a second transmission on a second set of layers transmitted from the second set of DMRS ports.

3. The base station of claim 2, wherein the first DCI further comprises a second pre-emption indication, and the downlink pre-emption configuration information further comprises a second indication indicating a start position of the second pre-emption indication within the first DCI.

4. The base station of claim 3, wherein the first pre-emption indication, in the first DCI, indicates a portion of resources of the first set of layers on which no transmission is intended to the UE and the second pre-emption indication indicates a portion of resources of the second set of layers on which no transmission is intended to the UE.

5. The base station of claim 1, wherein:
the at least one processor is configured to cause the base station to transmit configuration information indicating a first control-resource set (CORESET) group and a second CORESET group;
the first DCI and a second DCI for scheduling a first PDSCH transmission are transmitted in the first CORESET group; and
a third DCI for scheduling a second PDSCH transmission is transmitted in the second CORESET group.

6. A method at a user equipment (UE), the method comprising:
receiving, at the UE, first downlink pre-emption configuration information, wherein the first downlink pre-emption configuration information comprises a first indication indicating a start position of first pre-emption indication within a first downlink control information (DCI);
receiving, at the UE, the first DCI comprising the first pre-emption indication; and
receiving a second DCI for scheduling a physical downlink shared channel (PDSCH) transmission and for indicating a first transmission configuration indicator TCI) state and a second TCI state;
wherein the first pre-emption indication in the first DCI comprises an indicator which indicates that the first pre-emption indication is associated with one TCI state of the first TCI state or the second TCI state.

7. The method of claim 6, further comprising:
wherein the first TCI state is associated with a first set of code division multiplexing (CDM) groups comprising a first set of demodulation reference signal (DMRS) ports and a second TCI state is associated with a second set of CDM groups comprising a second set of DMRS ports;
the indicator further indicates a portion of resources of one of the first set of layers and the second set of layers associated with the one TCI state on which no transmission is intended to the UE; and
wherein the PDSCH transmission comprising a first data transmission on a first set of layers transmitted from the first set of DMRS ports and a second transmission on a second set of layers transmitted from the second set of DMRS ports.

8. The method of claim 7, wherein the first DCI further comprises a second pre-emption indication, and the first downlink pre-emption configuration information further comprises a second indication indicating a start position of the second pre-emption indication within the first DCI.

9. The method of claim 8, wherein the first pre-emption indication, in the first DCI, indicates a portion of resources of the first set of layers on which no transmission is intended to the UE and the second pre-emption indication indicates a portion of resources of the second set of layers on which no transmission is intended to the UE.

10. The method of claim 8, further comprising:
receiving configuration information associating the first indication with one TCI state of the first TCI state and the second TCI state and associating the second indication with the other TCI state of the first TCI state and the second TCI state;
wherein the first pre-emption indication indicates a portion of resources of one of the first set of layers and the second set of layers associated with the one TCI state on which no transmission is intended to the UE; and wherein the second pre-emption indication indicates a portion of resources of the other one of the first set of layers and the second set of layers on which no transmission is intended to the UE.

11. The method of claim 7, wherein the first pre-emption indication indicates a portion of resources of the second set of layers on which no transmission is intended to the UE.

12. The method of claim 6, further comprising:
receiving configuration information indicating a first control-resource set (CORESET) group and a second CORESET group;
wherein the first DCI and a second DCI for scheduling a first PDSCH transmission are transmitted in the first CORESET group; and
wherein a third DCI for scheduling a second PDSCH transmission is transmitted in the second CORESET group.

13. The method of claim 12, wherein the first DCI further comprises a second pre-emption indication, and the first downlink pre-emption configuration information further comprises a second indication indicating a start position of the second pre-emption indication within the first DCI.

14. The method of claim 13, further comprising:
receiving configuration information associating the first indication with one of the first CORESET group and the second CORESET group and associating the second indication with the other one of the first CORESET group and the second CORESET group;
wherein the first pre-emption indication indicates a portion of resources of one of the first PDSCH and the second PDSCH associated with the one CORESET group on which no transmission is intended to the UE; and
wherein the second pre-emption indication indicates a portion of resources of the other one of the first PDSCH and the second PDSCH on which no transmission is intended to the UE.

15. The method of claim 12, wherein the first pre-emption indication indicates a portion of resources of the first PDSCH on which no transmission is intended to the UE.

16. The method of claim 12, further comprising:
receiving configuration information associating the first indication with one CORESET group of the first CORESET group and the second CORESET group, wherein the first pre-emption indication indicates a portion of resources of one of the first PDSCH and the second PDSCH associated with the one CORESET group on which no transmission is intended to the UE.

17. A user equipment (UE), comprising:
at least one memory; and
at least one processor coupled with the at least one memory and configured to cause the UE to:
receive first downlink pre-emption configuration information, wherein the first downlink pre-emption configuration information comprises a first indication indicating a start position of first pre-emption indication within a first downlink control information (DCI);
receive the first DCI comprising the first pre-emption indication; and
receive a second DCI for scheduling a physical downlink shared channel (PDSCH) transmission and for indicating a first transmission configuration indicator (TCI) state and a second TCI state;
wherein the first pre-emption indication in the first DCI comprises an indicator which indicates that the first pre-emption indication is associated with one TCI state of the first TCI state or the second TCI state.

18. A processor for wireless communication, comprising:
at least one controller coupled with at least one memory and configured to cause the processor to:
receive first downlink pre-emption configuration information, wherein the first downlink pre-emption configuration information comprises a first indication indicating a start position of first pre-emption indication within a first downlink control information (DCI);
receive the first DCI comprising the first pre-emption indication; and
receive a second DCI for scheduling a physical downlink shared channel (PDSCH) transmission and for indicating a first transmission configuration indicator (TCI) state and a second TCI state;
wherein the first pre-emption indication in the first DCI comprises an indicator which indicates that the first pre-emption indication is associated with one TCI state of the first TCI state or the second TCI state.

* * * * *